(12) United States Patent
Eriksson

(10) Patent No.: US 9,567,200 B2
(45) Date of Patent: Feb. 14, 2017

(54) VENTED KEG CLOSURE

(71) Applicant: PETAINER LARGE CONTAINER IP LIMITED, Peterborough (GB)

(72) Inventor: Andreas Eriksson, Lidkoeping (SE)

(73) Assignee: Petainer Large Container IP Limited, London (GB)

( * ) Notice: Subject to any disclaimer, the term of this patent is extended or adjusted under 35 U.S.C. 154(b) by 0 days.

(21) Appl. No.: 14/441,959

(22) PCT Filed: Nov. 12, 2013

(86) PCT No.: PCT/GB2013/052969
§ 371 (c)(1),
(2) Date: May 11, 2015

(87) PCT Pub. No.: WO2014/072744
PCT Pub. Date: May 15, 2014

(65) Prior Publication Data
US 2015/0291410 A1    Oct. 15, 2015

(30) Foreign Application Priority Data
Nov. 12, 2012  (GB) .................................. 1220358.4

(51) Int. Cl.
*B65D 51/18*  (2006.01)
*B67D 1/08*  (2006.01)
(Continued)

(52) U.S. Cl.
CPC ......... *B67D 1/0808* (2013.01); *B65D 43/0204* (2013.01); *B65D 47/06* (2013.01);
(Continued)

(58) Field of Classification Search
CPC ... B67D 1/0808; B67D 1/0802; B67D 1/0831; B67D 2001/0824; B65D 47/32; B65D 43/0204; B65D 85/72; B65D 47/06; B65D 51/18; B65D 2251/0081; B65D 2251/009; B65D 2251/0028; C12C 11/006; C12C 11/11
(Continued)

(56) References Cited

U.S. PATENT DOCUMENTS 3,596,809 A * 8/1971 Taubenheim ........ B67D 1/0831
137/212
3,698,417 A * 10/1972 Smith ................... B67D 1/0802
137/212

(Continued)

FOREIGN PATENT DOCUMENTS

GB    524294    8/1940
GB    2107687 A  5/1983
(Continued)

OTHER PUBLICATIONS

Combined Search and Examination Report under Sections 17 and 18(3) dated Mar. 13, 2013 pertaining to United Kingdom Patent Application No. GB1220358.4.
(Continued)

*Primary Examiner* — Robert J Hicks
*Assistant Examiner* — Kareen Thomas
(74) *Attorney, Agent, or Firm* — Dinsmore & Shohl LLP

(57) ABSTRACT

A vented keg closure (1) for use with a keg (30) that contains a fermenting beverage, with the closure (1) comprising a filter member (41) disposed within an airway of the closure (1) that communicates between an internal headspace (36) of the keg (30) and an environment external to the keg (30). The closure (1) has a first configuration wherein the filter member (41) is located at a first position at which it filters gas flowing through the airway. The closure (1) also has a second configuration wherein the filter member (41) is located at a second position at which gas flow through the
(Continued)

airway can be increased by at least partially bypassing the filter (41). The extent of movement between the first and second configurations is controlled by the gas pressure difference across the airway.

19 Claims, 3 Drawing Sheets

(51) Int. Cl.
*C12C 11/00* (2006.01)
*C12C 11/11* (2006.01)
*B65D 43/02* (2006.01)
*B65D 47/32* (2006.01)
*B65D 47/06* (2006.01)
*B65D 85/72* (2006.01)

(52) U.S. Cl.
CPC ............ *B65D 47/32* (2013.01); *B65D 51/18* (2013.01); *B65D 85/72* (2013.01); *B67D 1/0802* (2013.01); *B67D 1/0831* (2013.01); *C12C 11/006* (2013.01); *C12C 11/11* (2013.01); *B65D 2251/009* (2013.01); *B65D 2251/0028* (2013.01); *B65D 2251/0081* (2013.01); *B67D 2001/0824* (2013.01); *B67D 2210/00007* (2013.01)

(58) Field of Classification Search
USPC .............. 220/202, 203.01, 203.04, 203.07, 203.23,220/203.27, 203.29, 303, 360, 366.1, 367.1; 222/251, 394, 397, 336, 400.7; 137/109, 137/115.01, 115.13, 115.17, 154, 206, 209, 212
See application file for complete search history.

(56) References Cited

U.S. PATENT DOCUMENTS

| 3,743,145 A | * | 7/1973 | Johnston | B67D 1/0832 222/400.7 |
| 4,350,270 A | * | 9/1982 | Nezworski | B67D 1/0832 222/336 |
| 4,728,010 A | * | 3/1988 | Johnston | B67D 1/0832 137/212 |

FOREIGN PATENT DOCUMENTS

| GB | 2181417 A | 4/1987 |
| GB | 2199815 A | 7/1988 |
| GB | 2204027 A | 11/1988 |
| GB | 2212791 A | 8/1989 |

OTHER PUBLICATIONS

International Search Report and Written Opinion dated Mar. 11, 2014 pertaining to International Patent Application No. PCT/GB2013/052969.

* cited by examiner

VENTED KEG CLOSURE

This invention relates to a closure for a keg. In particular, the invention relates to a vented keg closure for use with fermenting beverages.

It is necessary for cask-conditioned ale, sometimes referred to as "real ale", to undergo secondary fermentation in the cask from which it is served. Primary fermentation is carried out at the brewery after which the ale is sealed into a cask. A small amount of the yeast that is involved in primary fermentation is also transferred into the cask and continues to work inside the sealed cask, thus "cask-conditioning" the ale. After the cask has been delivered to a pub, and enough time has passed for the ale to settle and mature, the cask can be opened to vent the gaseous products of secondary fermentation.

Secondary fermentation can take several days and so a "soft spile" (i.e. a porous peg) is typically fitted into a shive hole of the cask. This prevents contamination of the ale whilst also allowing the gaseous products of secondary fermentation to escape. When the ale is ready to drink, a bunghole of the cask is tapped and connected to a hand-pumped beer engine that serving staff use to draw the ale from the cask. This requires air to flow easily into the cask as the ale is drawn out, and so the soft spile needs to be completely removed from the shive hole. When the pub is closed and the ale is not being dispensed, a non-porous peg—a "hard spile"—may be inserted into the shive hole to minimise spoilage.

As well known in the art, traditional casks have two openings; the shive hole through which the cask is vented, and the bunghole through which the cask is tapped via a keystone. The shive hole is located halfway down on the curved sidewall of a typically barrel-shaped cask. When the cask is laid on its curved side upon a stillage, with the shive hole facing upwards, the bunghole is positioned close to rim at the lower-most point on the circular end wall of the cask. The cask is also tilted forward to ensure that most of the liquid within the cask can drain out through the bunghole. It is necessary to orient the cask like this to ensure proper venting and dispensing of the ale.

Thus, existing casks take up a lot of space in a beer cellar when in this orientation, especially when used in conjunction with a stillage. Furthermore, when the casks have been emptied, changing the position or orientation of the casks can be difficult, and often requires removing the tap, and plugging the bunghole and shive hole to prevent the dregs of the cask spilling out.

Another container for storing, transporting and dispensing beverages such as beer is commonly referred to as a keg. Kegs generally only have a single opening within which two flow paths permit the dispensing of beer via a propellant gas under pressure, as is known in the art. Kegs do not have a facility in which a beverage can be vented to allow secondary fermentation, and so as such are only suitable for use with beverages that have been fully fermented. However, kegs have certain advantages over casks. Kegs can store and dispense beer from an upright position through the use of a dip-tube. Accordingly, the space utilisation of a keg is better than a cask due to its smaller footprint. Furthermore, the single opening of a keg increases its structural integrity, reduces its complexity of use and reduces its cost of manufacture, in contrast with a cask that has two openings. Thus, it would be beneficial to be able to use a keg for beverages requiring secondary fermentation. This would be of particular benefit to keg manufactures wanting to use the same container type for different types of beverages, thus maximising the effect of economies of scale.

One solution is described in patent publication number GB2181417A by Brooks, the contents of which are hereby incorporated by reference. Brooks describes an inlet/outlet fitting for a keg which allows a keg previously suited to fully fermented beverages to be used for beverages requiring secondary fermentation. The fitting includes a tubular spear to allow beverage dispensing when the keg is upright and a closable vent to permit the escape of fermentation gases. The fitting also includes a separate one-way inlet valve which permits air to enter the keg to replace the dispensed product and also a blow-off safety valve. The fitting of Brooks has a relatively complicated arrangement with each of the valves and the vent being provided on separate branches stemming from the body of the fitting. The vent is provided with a vent plug which must be opened during fermentation, and closed again afterwards to prevent over-venting. However, as fermentation may continue after the vent is closed, this can lead to an overpressure within the container which may not exceed the pressure triggering the blow-off valve, but can cause the keg to spurt liquid. Another drawback of the Brooks fitting is that when the vent or one-way inlet valve are open, they can permit entry of dust and other contaminants that can quickly spoil the ale within the keg. This is a problem shared with traditional cask arrangements; when in a configuration for dispensing beverage, contaminants can easily enter via the shive hole.

Other drawbacks associated with the Brooks fitting are also shared with existing keg and cask arrangements. For example, regardless of orientation, even if depleted kegs or casks are moved to a different position within the beer cellar, they continue to take up space until they are collected. Also, the transport of empty kegs and casks is not space and fuel efficient, and reliably cleaning kegs and casks is highly energy intensive. Thus, the use of kegs and casks as part of a "two-way" beverage distribution system is environmentally unfriendly. However, it is necessary because the cost of producing kegs and casks is so expensive; they are typically made of aluminium or stainless steel—and so they simply cannot be discarded. The relatively high scrap value also engenders their theft.

It is against this background that the present invention has been devised.

SUMMARY OF THE INVENTION

According to a first aspect of the present invention there is provided a vented keg closure for use with a keg containing a fermenting beverage. Ideally, the closure comprises a filter member disposed within an airway of the closure, the airway being arranged to communicate between an internal headspace of the keg and an environment external to the keg, the closure having:

a first configuration allowing the venting of gaseous products of fermentation and in which the filter member is located at a first position at which it filters the majority of the gas flowing through the airway; and a second configuration wherein the filter member is located at a second position at which gas flow through the airway can be increased by at least partially bypassing the filter;

wherein the extent of movement between the first and second configurations is controlled by the gas pressure difference across the airway.

Advantageously, the filter of the closure allows the venting of the gaseous products of secondary fermentation whilst at the same time preventing ingress of contaminants. However, unlike a traditional "soft-spile" the closure does not unduly restrict the inflow of gas when it is required, for example, when the ale within the keg is being extracted via a beer pump, and an equal quantity of gas needs to flow into the keg. In particular, when the gas pressure difference across the airway changes—as caused by beer extraction, the gas flow through the airway (or, alternatively the effective cross-sectional area of the airway) can be increased in response. Thus, when the keg is connected to a beer line for dispensing of beverage, unless beverage is drawn out from the keg, the majority of gas flow into the keg has to pass through the filter member. This presents a significant advantage over traditional casks which need to have their shive hole permanently open when connected and ready to dispense ales.

Preferably, the filter member filters substantially all the gas flowing through the airway when at the first position. Ideally, the filter member is biased towards the first position.

Ideally, a pressure difference causing an outflow of gas through the airway from the headspace to the external environment drives the filter member towards the first position.

Ideally, a pressure difference causing an inflow of gas through the airway from the external environment to the headspace drives the filter member towards the second position.

Ideally, the vented keg closure further comprises a bypass member, the filter member being movable between the first and second positions relative to the bypass member to vary the effective cross-sectional area through the airway.

Ideally, the vented keg closure is arranged so that relative movement between the filter member and the bypass member from the first position to the second position increases the effective cross-sectional area through the airway.

Ideally, the bypass member surrounds the filter member so that movement towards the second position enables gas flow around a periphery of the filter member. Advantageously, this increases the effective cross-sectional area of the airway. Ideally, gas flow around the periphery of the filter member is via the bypass member.

Preferably, the vented keg closure further comprises a biasing spring arranged to bias the filter member into the first position.

Preferably, the vented keg closure further comprises a venting tube within which the airway is defined and within which the filter member is located for movement between the first and second positions.

Preferably, the vented keg closure further comprises a dispense tube configured for the dispensing of beverage from within the keg, the dispense tube being separate from the airway.

Preferably, the dispense tube comprises a dip-tube for drawing beverage out from an internal base of the keg. Preferably, the dip-tube comprises a sediment strainer.

Preferably, the vented keg closure further comprises a cap for sealing the airway of the closure when the cap is fully coupled to the closure. Ideally, the cap is further arranged to unseal the airway when at least partly uncoupled from the closure.

Preferably, the vented keg closure further comprises a cap-retention means to prevent full uncoupling of the cap from the closure. Ideally, the cap-retention means is biased into a cap-retaining position at which it prevents full uncoupling of the cap from the closure. Ideally, the cap-retention means is manually movable between the cap-retaining position and a cap-releasing position at which the cap may be fully uncoupled from the closure.

Preferably, the vented keg closure is arranged for snap-fit engagement with the neck of a keg.

Naturally, the invention also extends to a keg in combination with the vented closure of the first aspect of the present invention. Ideally, the keg is made of blow-moulded PET (polyethylene terephthalate). Advantageously, this allows the keg to be light-weight, and manufactured relatively cheaply. Furthermore, when empty, the keg can be easily crushed and recycled. These advantages lead to an environmentally-friendly "one-way" cask ale storage and distribution system. Ideally, the keg comprises a single outlet.

Ideally, the keg is transparent. Advantageously, this allows the level of the beverage within the keg to be visible. Furthermore, it allows the extent of the settling of the beverage within the keg to be determined.

Further features and advantages of the present invention will become apparent when considering the specific embodiments of the present invention which are described below, by way of example, with reference to the following drawings.

SPECIFIC DESCRIPTION

Figure 1:
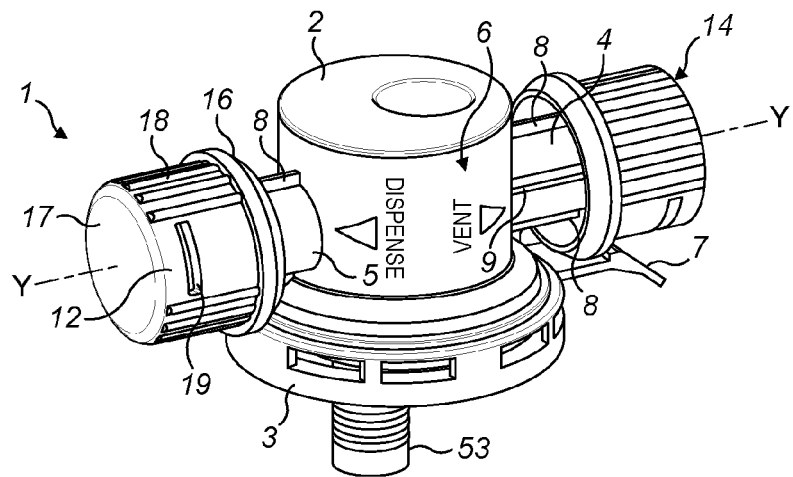
FIG. 1 is perspective side view of a vented keg closure of an embodiment of the present invention.
Figure 2:
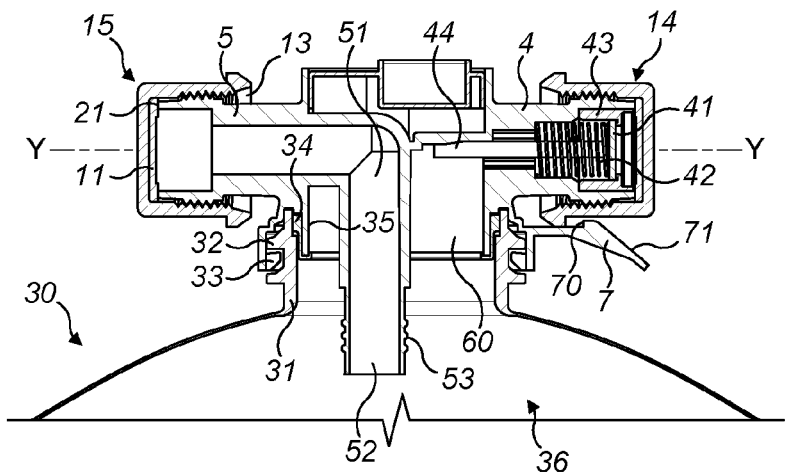
FIGS. 2 and 3 are cross-sectional views of the vented keg closure of FIG. 1 shown snap-fitted to the neck of a plastics keg.
Figure 3:
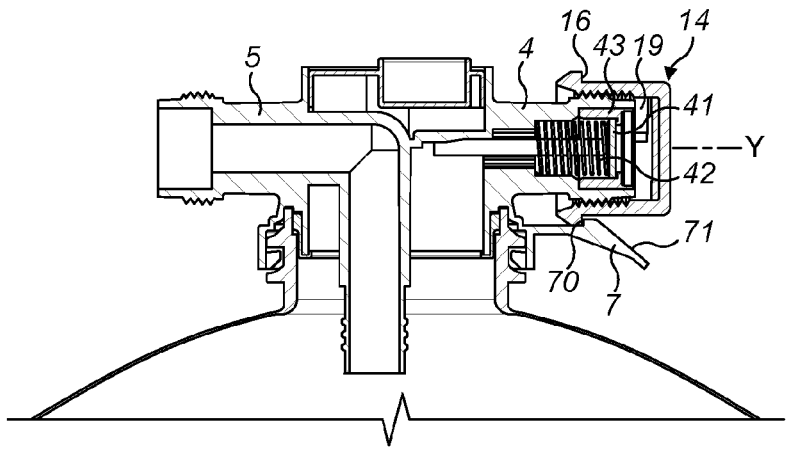

FIG. 1 is perspective view of a vented keg closure 1 of an embodiment of the present invention, the closure 1 being shown in isolation. FIGS. 2 and 3 are cross-sectional views of the vented keg closure 1 of FIG. 1 snap-fitted to the neck 31 of a keg 30, the keg 30 being blow-moulded from a preform of PET (polyethylene terephthalate). It will be appreciated that the whole keg 30 is not shown in FIGS. 2 and 3—only its uppermost region with its neck 31 surmounting its domed head. Nonetheless, it will be appreciated that the keg 30 has substantially cylindrical side-walls and a self-standing base. The base allows the keg to be freestanding thereby minimising its footprint and so maximising space utilisation when the keg 30 is placed within a beer cellar.

Referring to FIG. 1, the closure 1 comprises a central body 2 made from injection-moulded polypropylene having an integrally-formed skirt 3. The closure 1 also defines integrally-formed tubes; a venting tube 4 and dispensing tube 5 which branch out from the central body 2 away from one another. The tubes 4, 5 share a common longitudinal axis Y. Indicia 6 on the outer surface of the central body 2 visually differentiate between each tube 4, 5.

The closure 1 also comprises resilient cap retention clip 7 integrally-formed with and extending from the skirt 3. The clip 7 extends parallel to the venting tube 4, and comprises a latch formation 70 for engaging with a screw-cap as will be described in further detail below.

At a region where the tubes 4, 5 join with the central body 2, the tubes 4, 5 each define upper and lower reinforcing fins 8 which extend along and out from the outer surface of the tubes 4, 5. The fins 8 extend in diametrically-opposed radial directions relative to the longitudinal axis Y of the tubes 4, 5. At the same region of the venting tube 4, also extending along and out from the outer surface of the venting tube in a direction transverse to the fins 8, are a pair of ridges 9.

Also defined on the outer surface of the tubes 4, 5, but away from the central body 2, are external threads onto which are screw-coupled screw-caps 14, 15 for opening and closing each respective tube 4, 5. The screw-caps 14, 15 are manufactured from a common mould and so are substantially identical. Accordingly, the following description of the features and operation of the screw-cap 15 that is fitted to the dispensing tube 5 also applies, where context allows, to the screw-cap 14 fitted to the venting tube 4. Furthermore, the same reference numerals are used to indicate features of each screw-cap 14, 15 that are alike.

The screw-cap 15, comprises an approximately cylindrical side-wall 12, from the outer surface of which protrude finger grips 18 to facilitate manual turning of the screw-cap 15 relative to the dispensing tube 5. To this end, the inner surface of the side-wall 12 defines a threaded bore 13. When threaded to the dispensing tube 5, the rotational axis of the screw-cap 15 is aligned with the longitudinal axis Y of the dispensing tube 5.

The screw-cap 15 also comprises an annular mouth portion 16 at the open end of the bore 13 and a closed end portion 17 at the closed end of the bore 13, with the side-wall 12 gently tapering inwardly from the mouth portion 16 to the closed end portion 17. The finger grips 18 extend longitudinally along the side-wall 12 between the mouth portion 16 and the end portion 17, and are equispaced circumferentially from one another at regular intervals. A curved minor section of the side-wall 12 is bare of finger grips 16, instead having defined within it a venting slot 19 which communicates with the bore 13 of the screw-cap 15. The venting slot 19 is elongate in a circumferential direction and positioned adjacent to the closed end portion 17 of the screw-cap 15.

Referring to FIG. 2, the screw-cap 15, at the closed end of the bore 13, defines a seat 11 which seals against an annular end lip 21 of the dispensing tube 5 when the screw-cap 15 is screwed fully onto it. When the screw-cap 15 is partly unscrewed from the dispensing tube 5, the sealing effect of the screw-cap 15 is broken as the seat 11 moves away from the annular end lip 21 and the venting slot 19 comes into communication with the interior of the dispensing tube 5. By way of illustration, FIG. 3 shows the other screw-cap 14 of the venting tube 4 in such a partly unscrewed configuration.

It will be noted that the screw-cap 15 does not need to be fully unscrewed from the dispensing tube 5 for the sealing effect of the screw-cap 15 to be broken. However, as the effective cross-sectional area of the venting slot 19 is significantly smaller than that of the dispensing tube 5, unrestricted opening of the dispensing tube 5 requires the screw-cap 15 to be fully uncoupled and removed from the dispensing tube 5 (as shown in FIG. 3).

Referring back to FIG. 2, the keg 30 comprises a cylindrical neck 31 having an outer flange 32 at its upper end. When fitting the closure 1 to the keg 30, the skirt 3 is aligned with the neck 31 and the closure 1 is push-fitted onto the neck 31 of the keg 30. Radially-inwardly-facing snap-fit formations 33 on the skirt 3 of the closure 1 resiliently snap over the flange 32 as the closure 1 and the keg 30 are brought together. To aid this, the skirt 3 has a series of elongate circumferential windows formed in it that facilitate resilient flexing of the skirt 3 during snap-fitting of the skirt 3 over the flange 32.

The closure 1 further comprises a tail portion 35 which is sized to fit within the keg neck 31. The tail portion 35 gently tapers inwardly from its root—which is adjacent to the central body 2, to its axially-lower tip—which is spaced from the central body 2. This ensures that as the closure 1 is push-fit onto the keg 30, an annular seal 34 surrounding the tail portion 35 is wedged and so compressed between the tail portion 35 and the keg neck 31, thus sealing the closure 1 to the keg 30. When the closure 1 is so fitted, hollow regions of the central body 2 and the tail portion 35 together define a central cavity 60 that communicates with an internal headspace 36 of the keg 30.

The dispensing tube 5 leads to a down pipe 51 which extends out through the tail portion 35 into the keg 30. The down pipe 51 terminates at a tubular end portion 52 which extends down into the interior of the keg 30 beyond the skirt 3 and the tail portion 35. The tubular end portion 52 is arranged to receive a dip-tube (not shown) which extends down to the bottom of the keg 30 allowing the extraction of beverage therefrom. The tubular end portion 52 comprises on its outer cylindrical surface a series of axially-spaced circumferential protrusions 53 which aid the retention of the dip-tube when it is push-fitted telescopically over the tubular end 52 of the down pipe 5. The height and configuration of the dip-tube is typically chosen to allow extraction of substantially all the beverage from within the keg 30. However, this may be varied for different types of beverage; it can be undesirable to dispense sediment forming in some types of beverage and so the dip-tube may be chosen to be shorter to avoid the sediment, and/or may be provided with a strainer to strain sediment from the liquid beverage to be dispensed.

The venting tube 4 defines an airway which communicates with the internal headspace 36 of the keg 30 via the central cavity 60. The airway can also communicate with an environment external to the keg 30—typically the air within a beer cellar—depending on the coupling extent of the screw-cap 14 to the venting tube 4. By way of illustration, in FIG. 2, airway access to the external environment is blocked by the screw-cap 14 which is fully screwed onto the venting tube 4. However, in FIG. 3, the airway is able to communicate between the internal headspace 36 of the keg 30 and the environment external to the keg 30 via the screw-cap's venting slot 19 because the screw-cap 14 is partly unscrewed from the venting tube 4.

It should be noted that in the configuration shown in FIG. 3, the screw-cap 14 cannot be completely unscrewed from the venting tube 4. This is because the annular mouth portion 16 of the screw-cap 14 bears against the latch formation 70 of the cap retention clip 7. In particular, the annular mouth portion 16 and the latch formation 70 comprise confronting surfaces which engage to prevent the screw-cap 14 from being completely unthreaded from the venting tube 4. However, if required, the cap retention clip 7 can be deflected via pressure applied manually to a thumb-plate 71. As the thumb-plate 71 is deflected down towards the keg 30, the latch formation 70 moves so that it is no longer in the way of the annular mouth portion 16 thereby allowing the screw-cap 14 to be fully unscrewed from the venting tube 4.

The closure 1 also comprises a plate-like porous filter member 41, a coiled compression spring 42 and a bypass member 43. As shown, these components are accommodated within the venting tube 4 and cooperate with one another to modify gas flow through the venting tube 4. In particular, gas flow is modified by changing the effective cross-sectional area of an internal airway defined by the venting tube 4 as will be described in further detail below with reference to FIGS. 4 to 7.

Figure 4:
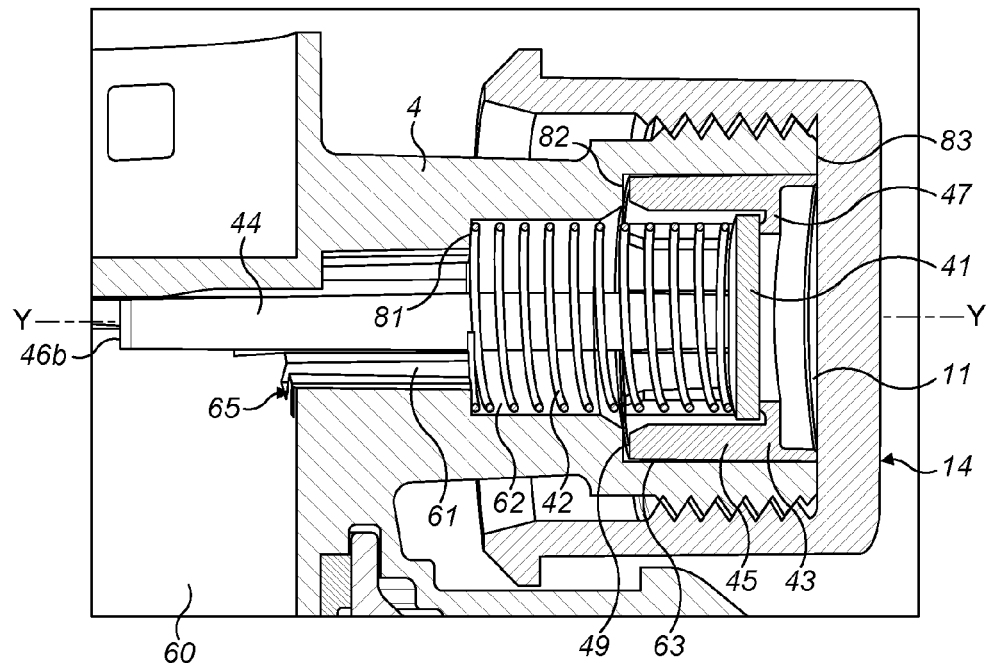
FIGS. 4 and 5 are enlarged views of a venting tube of the vented keg closure of FIG. 1, the view of FIG. 4 being a vertical cross-section and the view of FIG. 5 being a horizontal cross-section, each taken through a longitudinal axis of the venting tube.
Figure 5:
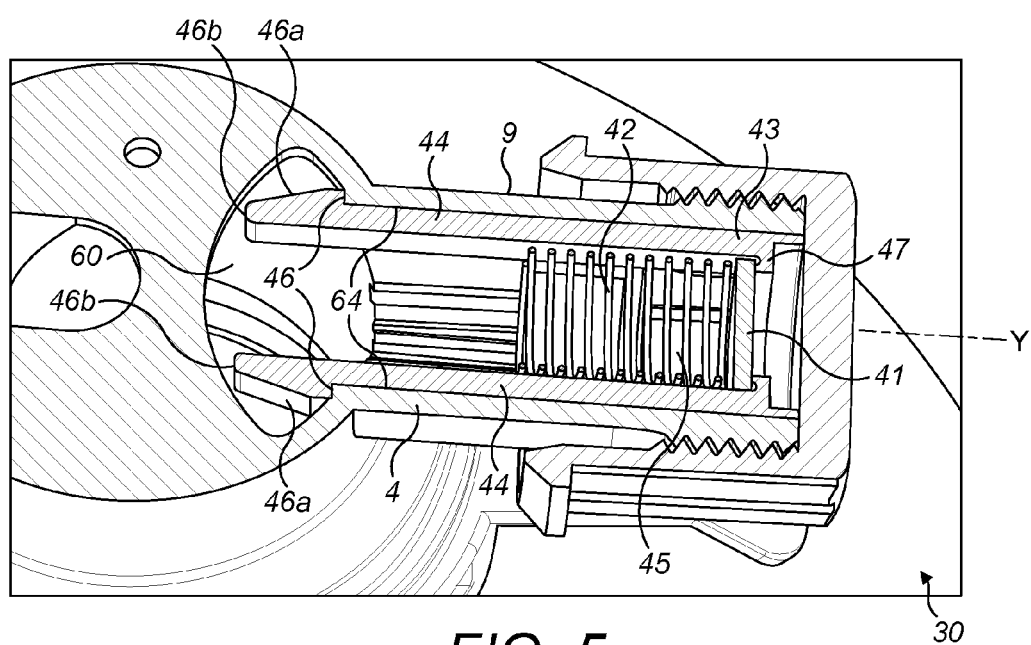

FIG. 4 is a vertical cross-sectional view and the FIG. 5 is a horizontal cross-sectional view of the venting tube 4 and associated components, each section being taken substantially through the longitudinal axis Y of the venting tube 4.

The bypass member 43 comprises an annular base 47 surmounted at its periphery by a tubular crown 45 which extends in an axial direction from the base 47 and terminates at an end-ring 49. The crown 45 is shaped and arranged to encircle and support the filter member 41 and also captures an end of the spring 42 when the bypass member 43 is assembled to the venting tube 4.

As best seen in FIG. 5, the bypass member 43 also comprises a pair of flexible elongate stems 44 which also extend in the same direction the crown 45 but axially beyond it. Each stem 44, at a remote end axially away from the base 47, supports a catch formation 46. Each catch formation 46 extends radially beyond the extent of its respective stem 44. Furthermore, at the remote end of each stem 44 is a ramp 46a that tapers radially inwardly from a respective catch formation 46 to a blunt edge 46b.

Figure 7:
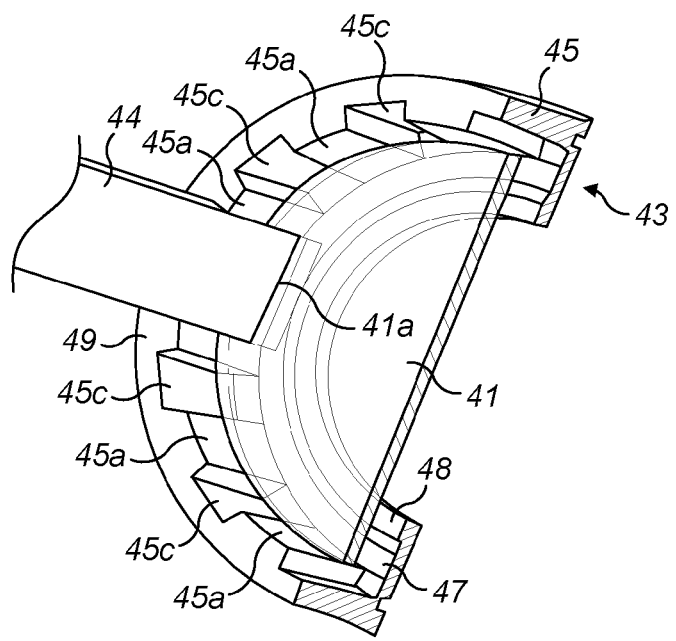
FIG. 7 is a perspective sectional view of a filter member and a bypass member of the closure of FIG. 1.

Further features of the bypass member 43 and filter member 41 are perhaps best shown in FIG. 7 which is a perspective sectional view of these components in isolation from the other components of the closure 1. For clarity, only one half of the bypass member 43 and the filter member 41 are shown, the other half mirroring the half that is shown.

The elongate stems 44 are rooted in both the base 47 and the crown 45 and are radially thicker than the crown 45 such that they infringe radially-inwardly into the space encircled by the crown 45. Accordingly, the filter member 41 is not completely shaped like a plate but rather has a pair of notches 41a defined within it so as to fit around the stems 44. These notches 41a register and guide the filter member 41 in an axial direction relative to the bypass member 43. Apart from the notches 41a, the outline of the filter member 41 otherwise is plate-like in shape with a radius slightly less than that of a radially-inwardly-facing surface 45a of the crown 45.

Within the radially-inwardly-facing surface 45a of the crown 45 is defined a plurality of trench formations 45c. The trench formations 45c extend along the entire length of the radially-inwardly-facing surface 45a in the axial direction and are circumferentially interspaced from one another at regular intervals. Furthermore, the trench formations 45c gently taper outwards as they extend away from the base 47 so that their circumferential width widens further from the base.

Immediately surrounding the central bore defined by the annular base 47 is an annular rest-piece 48 that protrudes in an axially-inward direction towards the filter member 41 and against which the filter member 41 rests when biased by the compression spring 42.

The features of the bypass member 43, including the rest-piece 48, the base 47, the crown 45, the trench formations 45c, the stems 44, the catch formations 46 etc. are made from an integral piece of injection-moulded polypropylene.

Referring back to FIGS. 4 and 5, as mentioned, the bypass member 43, the filter member 41 and the spring 42 fit within the venting tube 4. The internal shape of the venting tube 4 which accommodates these components is broadly defined by three approximately cylindrical chambers that are each centred on the longitudinal axis Y of the venting tube 4. A first chamber 61, which is located at an axially-innermost position, has the smallest radius of the three chambers. The first chamber 61 is adjacent to and communicates between the central cavity 60 and an intermediate second chamber 62. The second chamber 62 has an intermediate radius and in turn leads into an axially-outermost third chamber 63 that has the largest radius of the three chambers. These chambers are thus sized and arranged axially relative to one another in a radially-stepped arrangement. Moreover, the difference in chamber radii means that at the boundary between the first and second chamber 61, 62 there is defined an axially-outwardly-facing first annular shoulder 81 and at the boundary between the second and third chamber 62, 63 there is defined an axially-outwardly-facing second annular shoulder 82. The third chamber 63 terminates at an exit of the venting tube 4 and defines an axially-outwardly-facing annular end lip 83 against which the seat 11 of the screw-cap 14 seals.

The first and second annular shoulders 81, 82 are broken by a pair of grooves 64 that extend axially through the first and second chambers 61, 62 from the central cavity 60 to the third chamber 63. Furthermore, the grooves 64 extend in a radially-outward direction to the same extent as the third chamber 63. The grooves 64 are at a position on the inside surface of the venting tube 4 adjacent to the ridges 9 which are defined on the outer surface of the venting tube 4.

The first annular shoulder 81 is further broken by a plurality of channels 65 that extend axially through the first chamber 61 from the central cavity 60 to the second chamber 62 and furthermore extend in a radially-outward direction to the same extent as the second chamber 62. The channels 65 are circumferentially equispaced from one another at regular intervals and serve to increase the effective cross-sectional area of the first chamber 61 through which gas can flow.

During assembly, the filter member 41 is positioned between the annular base 47 of the bypass member 43 and the spring 42, and in this position, the bypass member 43 is aligned with and pushed into the venting tube 4. The bypass member 43 is aligned with the venting tube 4 by ensuring that the blunt edges 46b of the stems 44 of the bypass member 43 are registered with the grooves 64 defined in the venting tube 4. As the bypass member 43 is pushed into the venting tube 4, its ramps 46a ramp against the grooves 64 thereby flexing the stems 44 towards one another in a radially-inward direction. This allows the catch formations 46 and the stems 44 to enter and slide along the grooves 64. When the bypass member 43 is completely inserted into place within the venting tube 4, the catch formations 46 at the end of the stems 44 extend into the central cavity 60 beyond the end of the grooves 64 thereby allowing the stems 44 to spring resiliently away from one another. Thus, the catch formations 46 are able to engage with the walls of the central cavity 60, preventing retraction of the bypass member 43. In addition to this, further axial movement of the bypass member 43 into the central cavity 60 is prevented by virtue of the axially-inwardly-facing end-ring 49 bearing against the complementary-shaped and axially-outwardly-facing second annular shoulder 82 that is defined at the boundary between the second and third chamber 62, 63.

Also during assembly, the axially inner part of the spring 42 is captured and surrounded by the second chamber 62, and the axially outer part of the spring is captured and surrounded by the crown 45 of the bypass member 43. Moreover, the spring 42 and filter member 41 are sandwiched between the axially-outwardly-facing first annular shoulder 81 and the annular rest-piece 48 of the bypass member 43. As the bypass member 43 is inserted into position within the venting tube 4, the rest-piece 48 bears against the filter member 41, which in turn compresses the spring 42. Thus, when in the position shown in FIGS. 4 and 5 the filter 41 member is urged by the biasing of the spring 42 against the annular rest-piece 48.

It will be appreciated that the airway defined within the venting tube 4 is never blocked by the bypass member 43, the spring 42 or the filter member 41. Thus, when the screw-cap 14 is at least partly unscrewed from the venting tube 4—for example, as shown in FIG. 3—gas can flow between the internal headspace 36 of the keg 30 and the environment external to the keg 30. Notably, even when the filter member 41 bears against the annular rest-piece 48, gas can flow through it because it is porous.

However, as the filter member 41 decreases the effective cross-sectional area through the airway, gas flow through it is reduced. In view of this, the components of the closure 1 are arranged to change the effective cross-sectional area through the airway in response to pressure variations to thereby modifying gas flow and, in particular, the gas flow rate through the airway (assuming a constant pressure).

When there is no pressure difference across the airway, the compression spring 42 naturally urges the filter member 41 against the annular rest-piece 48 of the bypass member 43 such that gas is not able to flow through the airway without passing through the filter member 41. Moreover, contaminants cannot be carried through the airway into the interior of the keg without having to pass through the filter member 41.

Figure 6:
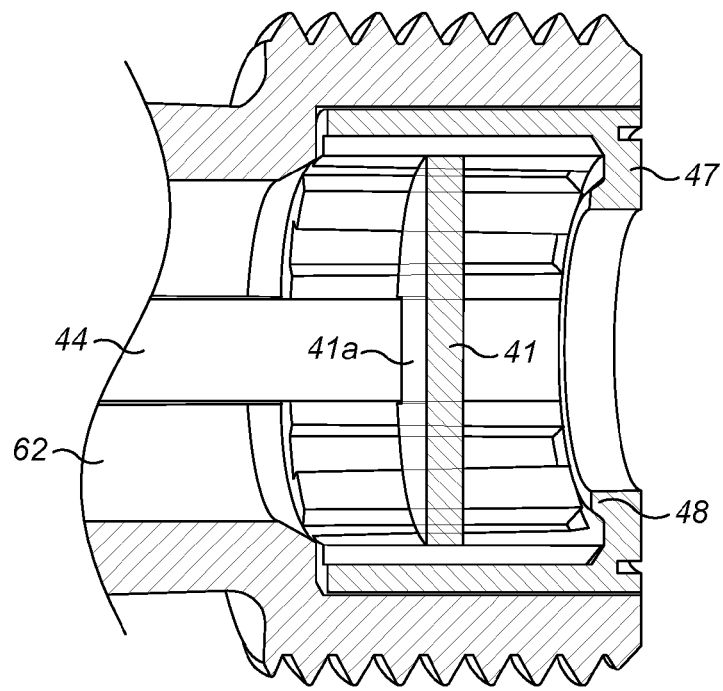
FIG. 6 is a simplified perspective side view of the venting tube of FIGS. 4 and 5.

Similarly, if the pressure difference causes an outflow of gas from the headspace 36 to the external environment, then this also urges the filter member 41 in the same direction. However, if the pressure difference causes a significant inflow of gas to the headspace 36, then the inward force of the gas axially displaces the filter member 41 away from the annular rest-piece 48, compressing the spring 42. Gas is therefore able to flow around the filter member 41 via the plurality of trench formations 45c. An example of the axially displaced filter member 41 is shown in FIG. 6 which is a simplified perspective side view of the venting tube of FIGS. 4 and 5, and shown for simplicity without the spring 42.

Furthermore, as the pressure differential across the airway is increased, the filter member 41 is displaced further away from its rest position against the rest-piece 48, and so the effective cross-sectional area through the airway is increased. This is as a result of the tapering of the trench formations 45c; gas is able to bypass the filter member 41 via a wider section of each trench formation 45c the further away the filter member 41 is from the rest piece 48.

The use and practical operation of the closure 1 together with the keg 30 will now be described. At a brewery, the keg 30 is blow-moulded on demand from a PET preform, and filled with a live beverage, typically ale, that has undergone primary fermentation but still contains active yeast. Accordingly, secondary fermentation within the keg 30 begins.

A dip-tube is fitted to the tubular end portion 52 of the down pipe 51 of the assembled closure 1, and inserted into position within the keg 30 as the closure 1 is snap-fitted to the neck 31 of the keg 30. The screw-caps 14, 15 are already screwed fully onto the venting and dispensing tubes 4, 5 and so the snap-fitting of the closure 1 seals the keg 30 ready for distribution to a pub or bar.

Following transportation, the yeast within the keg 30 is conditioned to the right temperature and allowed to settle within the beer cellar of the pub with the keg supported in its upright orientation. Advantageously, the PET is transparent, allowing a visual indication of the extent of the settling of the beverage.

To assist secondary fermentation of the beverage and release the gaseous products of fermentation, the screw-cap 14 of the venting tube 4 is partly unscrewed to break the sealing of the keg 30 allowing an airway to open up between the headspace 36 and the external environment via the venting slot 19.

As the gaseous products of secondary fermentation are produced, these escape through the filter member 41 which, due to the spring 42 and the outflow of gas, remains biased against the annular rest-piece 48. During this time, the filter member 41 prevents the ingress of dust, pests and other contaminants which may spoil the beverage. Furthermore, the filter member 41 minimises gas exchange between the headspace 36 and environment external to the keg 30, retaining naturally produced carbon dioxide within the keg 30 and thus minimising oxidation.

When the ale has undergone secondary fermentation and is ready to drink, the dispensing tube 5 is opened by removing the screw-cap 15, and a beer-line is threaded onto the dispensing tube 5. It will be noted that the thread of the dispensing tube 5 is sized to receive the standard-sized screw-on nut of the beer-line.

Alternatively, the arrangement of the closure 1 allows connection to beer-line during secondary fermentation. Advantageously, this obviates the need to visit the beer cellar twice—once to vent the keg 30 and another time to connect it to a beer line.

When serving staff hand-pump the beer engine, ale is drawn up through the dip-tube and dispensing tube 5. The removed ale therefore needs to be replaced by an equal volume of air. Moreover, the rate at which ale is drawn out of the keg 30 needs to be matched by the rate at which air enters the keg to avoid a significant under-pressure within the keg 30. If it is not, this can make it difficult to hand-pump the beer engine, and moreover, can cause the sidewalls of the keg 30 (which are made out of PET) to buckle inward. This can potentially destabilise the keg 30, causing it to fall over upsetting the settling of the ale.

The effective cross-sectional area of the filter member 41 alone is not sufficient to allow such an intake of air into the keg 30. However, as an under-pressure within the keg 30 develops, this draws the filter member 41 away from the annular rest-piece 48 and against the biasing of the spring 42. This increases the effective cross-sectional area within the airway by bypassing the filter member 41, allowing the rate of air entering the keg to match the rate at which the volume of beverage is extracted from the keg 30.

Due to the tapering of the trench formations 45c, the filter member 41 is only bypassed to an extent required to deliver the required inflow of air. In particular, the bypassing of the filter member 41 is variable and controlled in response to the magnitude of the pressure differential causing an under-pressure within the keg 30.

When beverage extraction ceases, the spring 42 returns the filter member 41 back into engagement with the annular rest-piece 48. Thus, when beverage is not being extracted, the filter member 41 is at a position that filters all gas passing through the airway defined by the venting tube 4 thereby minimising ingress of contaminants into the keg 30. Furthermore, if fermentation continues within the keg 30 after dispensing, its gaseous product can escape the keg 30 preventing an overpressure within the keg to develop.

It will be noted that the advantages of the present invention are particularly resonant with the handling and dispensing of "real ale" beverages to which it is considered inappropriate to introduce an extraneous gas. However, if required, the closure 1 supports the connection via the venting tube to a "cask breather" that introduces a blanket of carbon dioxide into the headspace 36 of the keg at atmospheric pressure to further minimise oxidation of the ale.

Further advantages of the closure 1 together with the keg 30 include:
- the provision of a low cost beverage dispensing system that is less prone to theft;
- the provision of a one-way system which can reduce transportation costs (the empty PET keg can simply be crushed and recycled after use);
- the PET container is blow-moulded on demand at the brewery and so the brewery can respond to seasonal increase in demand;
- reduction of handling of the keg at the brewery—there is no need to inspect, repair or wash casks;
- the weight of the PET keg is reduced far more than existing casks; and
- the PET keg can be transparent allowing the state of the beverage within to be assessed.

The invention claimed is:

1. A vented keg closure for use with a keg containing a fermenting beverage, the closure comprising a filter member disposed within an airway of the closure, the airway being arranged to communicate between an internal headspace of the keg and an environment external to the keg, the closure having:
 - a first configuration allowing venting of gaseous products of fermentation and in which the filter member is located at a first position at which it filters a majority of the gas flowing through the airway; and
 - a second configuration wherein the filter member is located at a second position at which gas flow through the airway can be increased by at least partially bypassing the filter;
 - wherein an extent of movement between the first and second configurations is controlled by the gas pressure difference across the airway.

2. The vented keg closure of claim 1, wherein the filter member filters substantially all the gas flowing through the airway when at the first position.

3. The vented keg closure of claim 1 wherein the filter member is biased towards the first position.

4. The vented keg closure of claim 1, wherein a pressure difference causing an outflow of gas through the airway from the headspace to the external environment drives the filter member towards the first position.

5. The vented keg closure of claim 1, wherein a pressure difference causing an inflow of gas through the airway from the external environment to the headspace drives the filter member towards the second position.

6. The vented keg closure of claim 1, further comprising a bypass member, the filter member being movable between the first and second positions relative to the bypass member to vary an effective cross-sectional area through the airway.

7. The vented keg closure of claim 6, arranged so that relative movement between the filter member and the bypass member from the first position to the second position increases the effective cross-sectional area through the airway.

8. The vented keg closure of claim 6 wherein the bypass member surrounds the filter member so that movement towards the second position enables gas flow around a periphery of the filter member.

9. The vented keg closure of claim 1, further comprising a biasing spring arranged to bias the filter member into the first position.

10. The vented keg closure of claim 1, further comprising a venting tube within which the airway is defined and within which the filter member is located for movement between the first and second positions.

11. The vented keg closure of claim 1, further comprising a dispense tube configured for the dispensing of beverage from within the keg, the dispense tube being separate from the airway.

12. The vented keg closure of claim 11, wherein the dispense tube comprises a dip-tube for drawing beverage out from an internal base of the keg.

13. The vented keg closure of claim 12, wherein the dip-tube comprises a sediment strainer.

14. The vented keg closure of claim 1, further comprising a cap for sealing the airway of the closure when the cap is fully coupled to the closure, the cap being further arranged to unseal the airway when at least partly uncoupled from the closure.

15. The vented keg closure of claim 14, further comprising a cap-retention means biased to prevent full uncoupling of the cap from the closure.

16. The vented keg closure of claim 1 arranged for snap-fit engagement with the neck of a keg.

17. A keg in combination with the closure of claim 1.

18. The keg of claim 17, wherein the keg is made of blow-moulded PET.

19. The keg of claim 17 wherein the keg is transparent.

* * * * *